(12) United States Patent
Love et al.

(10) Patent No.: US 7,457,588 B2
(45) Date of Patent: Nov. 25, 2008

(54) CHANNEL QUALITY INDICATOR FOR TIME, FREQUENCY AND SPATIAL CHANNEL IN TERRESTRIAL RADIO ACCESS NETWORK

(75) Inventors: Robert T. Love, Barrington, IL (US); Raja S. Bachu, Des Plaines, IL (US); Brian K. Classon, Palatine, IL (US); Ravikiran Nory, Grayslake, IL (US); Kenneth A. Stewart, Grayslake, IL (US); Yakun Sun, Evanston, IL (US)

(73) Assignee: Motorola, Inc., Schaumberg, IL (US)

( * ) Notice: Subject to any disclaimer, the term of this patent is extended or adjusted under 35 U.S.C. 154(b) by 389 days.

(21) Appl. No.: 11/194,718

(22) Filed: Aug. 1, 2005

(65) Prior Publication Data

US 2007/0026808 A1    Feb. 1, 2007

(51) Int. Cl.
*H04B 17/00* (2006.01)
(52) U.S. Cl. ............. 455/67.11; 455/67.13; 455/455; 455/450; 455/452.1; 455/63.1; 455/513; 370/208; 370/329; 370/468
(58) Field of Classification Search ............. 455/67.13, 455/67.11, 63.1, 436, 450, 452.1, 513; 370/208, 370/329, 203, 210, 207; 375/260
See application file for complete search history.

(56) References Cited

U.S. PATENT DOCUMENTS

| | | | | |
|---|---|---|---|---|
| 5,682,407 A * | 10/1997 | Funaki | | 375/240 |
| 5,790,549 A * | 8/1998 | Dent | | 370/479 |
| 5,886,988 A * | 3/1999 | Yun et al. | | 370/329 |
| 6,788,733 B1 * | 9/2004 | Whang et al. | | 375/148 |
| 6,816,832 B2 * | 11/2004 | Alanara et al. | | 704/205 |
| 7,016,319 B2 * | 3/2006 | Baum et al. | | 370/329 |
| 7,047,006 B2 * | 5/2006 | Classon et al. | | 455/434 |
| 7,062,295 B2 * | 6/2006 | Yoshii et al. | | 455/562.1 |
| 7,149,192 B2 * | 12/2006 | Kwak | | 370/320 |
| 7,170,928 B1 * | 1/2007 | Horneman et al. | | 375/225 |
| 7,209,460 B2 * | 4/2007 | Fitzek et al. | | 370/329 |
| 7,231,183 B2 * | 6/2007 | Pauli et al. | | 455/67.11 |
| 7,245,879 B2 * | 7/2007 | Sadri et al. | | 455/67.11 |
| 7,257,406 B2 * | 8/2007 | Ji | | 455/450 |
| 7,260,405 B2 * | 8/2007 | Kim et al. | | 455/452.2 |

(Continued)

FOREIGN PATENT DOCUMENTS

EP    1575234 A2    9/2005

(Continued)

OTHER PUBLICATIONS

3GPP TSG RAN1#44; Denver, US; XP-002404584; Feb. 13-17, 2006.

(Continued)

*Primary Examiner*—Marceau Milord
(74) *Attorney, Agent, or Firm*—Roland K. Bowler, II

(57) ABSTRACT

A wireless communication terminal (200) that communicates on a plurality of sub-carriers divided into a plurality of frequency bands, wherein each frequency band includes at least one sub-carrier. The terminal successively generates channel quality indicator (CQI) measurement information reports based on CQI measurements, wherein each report includes non-differential channel quality indicator measurement information for at least one of the frequency bands and differential channel quality indicator measurement information for all other frequency bands.

15 Claims, 3 Drawing Sheets

U.S. PATENT DOCUMENTS

| | | | | |
|---|---|---|---|---|
| 7,272,190 | B2* | 9/2007 | Blankenship et al. | 375/260 |
| 7,286,609 | B2* | 10/2007 | Maltsev et al. | 375/267 |
| 7,299,801 | B2* | 11/2007 | Hodson | 128/200.23 |
| 7,317,750 | B2* | 1/2008 | Shattil | 375/146 |
| 7,391,750 | B2* | 6/2008 | Kim et al. | 370/329 |
| 2005/0025039 | A1* | 2/2005 | Hwang et al. | 370/206 |
| 2005/0058097 | A1* | 3/2005 | Kang et al. | 370/329 |
| 2005/0094550 | A1* | 5/2005 | Huh et al. | 370/203 |
| 2005/0105589 | A1* | 5/2005 | Sung et al. | 375/130 |
| 2005/0111429 | A1* | 5/2005 | Kim et al. | 370/344 |
| 2005/0157639 | A1* | 7/2005 | Song et al. | 370/208 |
| 2005/0169229 | A1* | 8/2005 | Cho et al. | 370/344 |
| 2005/0201295 | A1* | 9/2005 | Kim et al. | 370/241 |
| 2005/0277422 | A1* | 12/2005 | Baker et al. | 455/450 |

FOREIGN PATENT DOCUMENTS

| | | |
|---|---|---|
| WO | 2004073245 A | 8/2004 |
| WO | 2005088870 A1 | 9/2005 |

OTHER PUBLICATIONS

3GPP TSG RAN1#43; Seoul, Korea; XP-002404198; Nov. 7-11, 2005.

IEEE 802.16 Broadband Wireless Access Working Group; Uplink Control Channels; XP-002404585; Mar. 11, 2004.

* cited by examiner

|   | 1 | 2 | 3 | 4 | 5 | 6 | 7 | 8 |
|---|---|---|---|---|---|---|---|---|
| 402 → | c | b | b | b | b | b | b | b |
| 404 → | b | c | b | b | b | b | b | b |
|   | b | b | c | b | b | b | b | b |
|   | b | b | b | c | b | b | b | b |
|   | b | b | b | b | c | b | b | b |
|   | b | b | b | b | b | c | b | b |

CHANNEL QUALITY INDICATOR FOR TIME, FREQUENCY AND SPATIAL CHANNEL IN TERRESTRIAL RADIO ACCESS NETWORK

FIELD OF THE DISCLOSURE

The disclosure relates generally to wireless communications, and more particularly to reporting channel quality information (CQI) for a plurality of frequency bands, wherein each frequency band includes one or more sub-channels and wherein the CQI useful for communication system scheduling, for example, in Orthogonal Frequency Division Multiple Access (OFDMA) systems, and related methods.

BACKGROUND OF THE DISCLOSURE

In Orthogonal Frequency Division Multiple Access (OFDMA) based wireless communication protocols and other protocols based on multi-carrier modulation methods, scheduling optimization can be performed in the time and frequency dimensions using a Frequency Selective (FS) scheduler. Idealized FS scheduling may result in as much as a 50% improvement in system throughput relative to Frequency Non-Selective (FNS) scheduling. FNS scheduling occurs in a Time-Division, Code Division Multiple Access (TD-CDMA) physical layer, which effectively permits scheduling only in the time domain. It is known generally for each mobile terminal, or equivalently User Equipment (UE), to provide a per-frequency band channel quality indicator (CQI) to enable FS scheduling by a Base Station (BS) scheduler.

The various aspects, features and advantages of the disclosure will become more fully apparent to those having ordinary skill in the art upon careful consideration of the following Detailed Description thereof with the accompanying drawings described below.

BRIEF DESCRIPTION OF THE DRAWINGS

FIG. 4 is a logical representation of a sequence of channel quality indicator information reports.

DETAILED DESCRIPTION

Figure 1:
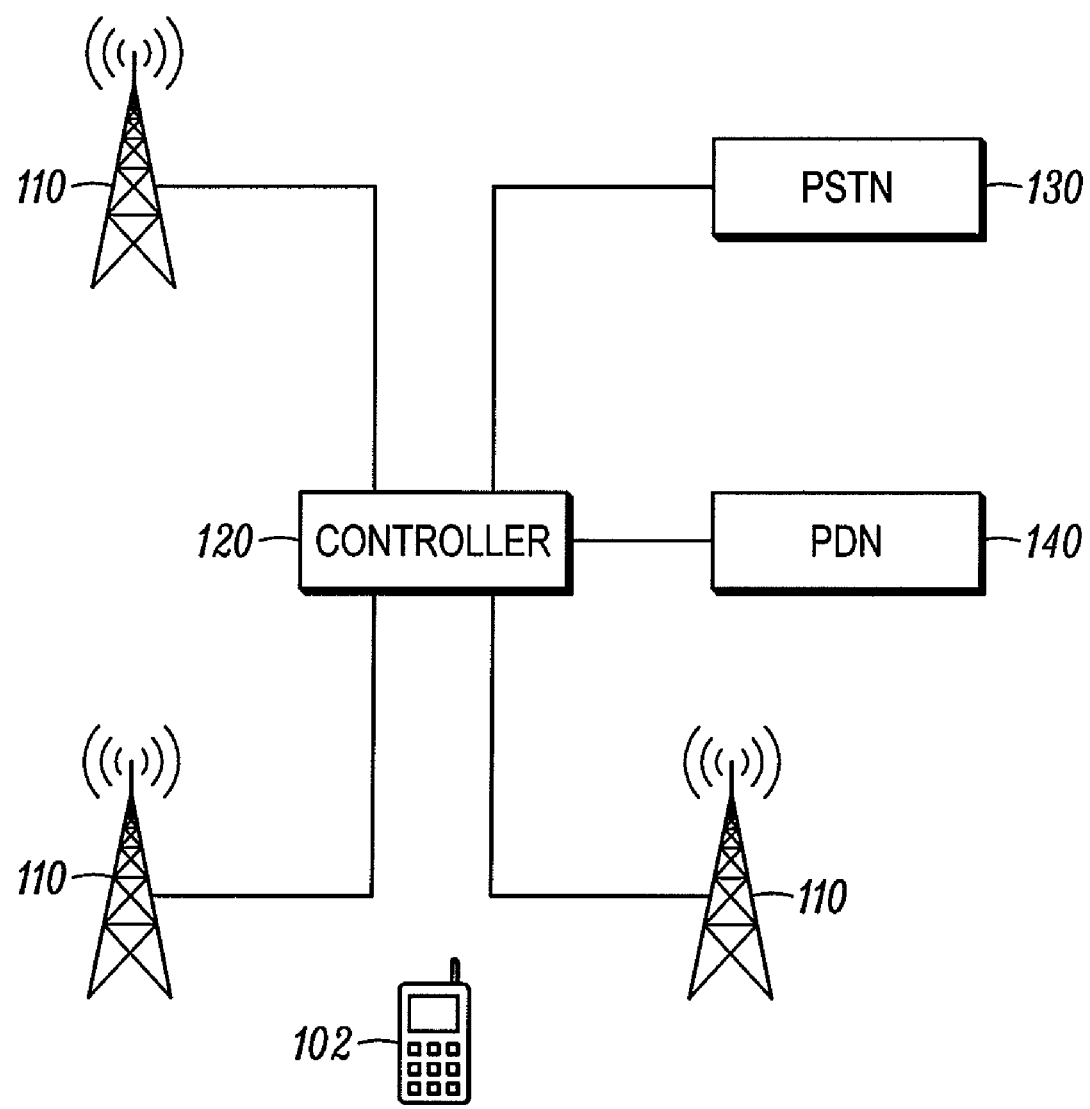
FIG. 1 illustrates an exemplary wireless communication system.

In FIG. 1, the exemplary wireless communication system comprises a cellular network including multiple cell serving base stations 110 distributed over a geographical region. The cell serving base stations or base station transceivers 110 are also commonly referred to as cell sites wherein each cell site consists of one or more cells, which may also be referred to as sectors. The base stations are communicably interconnected by a controller 120 that is typically coupled via gateways to a public switched telephone network (PSTN) 130 and to a packet data network (PDN) 140. The network also comprises management functionality including data routing, admission control, subscriber billing, terminal authentication, etc., which may be controlled by other network entities, as is known generally by those having ordinary skill in the art. Wireless mobile terminals, for example, cellular handset 102, communicate voice and/or data with each other and with entities via the network 100 and other networks, for example, the PSTN or PDN, as is also known generally by those having ordinary skill in the art.

Figure 2:
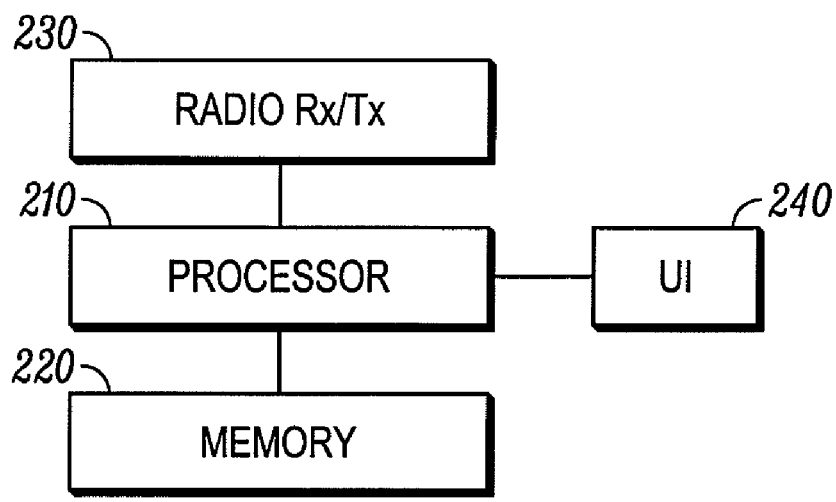
FIG. 2 illustrates an exemplary wireless communication terminal.

In FIG. 2, the exemplary wireless terminal 200 comprises a processor 210 communicably coupled to memory 220, for example, RAM, ROM, etc. A wireless radio transceiver 230 communicates over a wireless interface with the base stations of the network discussed above. The terminal also includes a user interface (UI) 240 including a display, microphone and audio output among other inputs and outputs. The processor may be implemented as a digital controller and/or a digital signal processor under control of executable programs stored in memory as is known generally by those having ordinary skill in the art.

In FIG. 1, the base stations 110 each include a scheduler for scheduling and allocating resources to mobile terminals in the corresponding cellular area. In schemes such as Orthogonal Frequency Division Multiple Access (OFDMA), multi-carrier access, or multi-channel CDMA wireless communication protocols including, for example, 802.16e, multi-carrier HRPD-A in 3GPP2, and the long term evolution of UTRA/UTRAN Study Item in 3GPP (also known as evolved UTRA/UTRAN (EUTRA/EUTRAN)), scheduling may be performed in the time and frequency dimensions using a Frequency Selective (FS) scheduler. Generally, to enable FS scheduling by the base station scheduler, each mobile terminal must provide a per frequency band channel quality indicator (CQI).

In OFDM and other communication protocols and formats where CQI reporting by the mobile station may be useful, the channel generally comprises a plurality of sub-carriers divided into a plurality of frequency bands, wherein each frequency band includes at least one sub-carrier. A sub-carrier may comprise concatenated carriers or individual carriers. For example, in CDMA multi-carrier systems, a carrier may be a sub-carrier wherein each frequency band has at least one sub-carrier.

Figure 3:
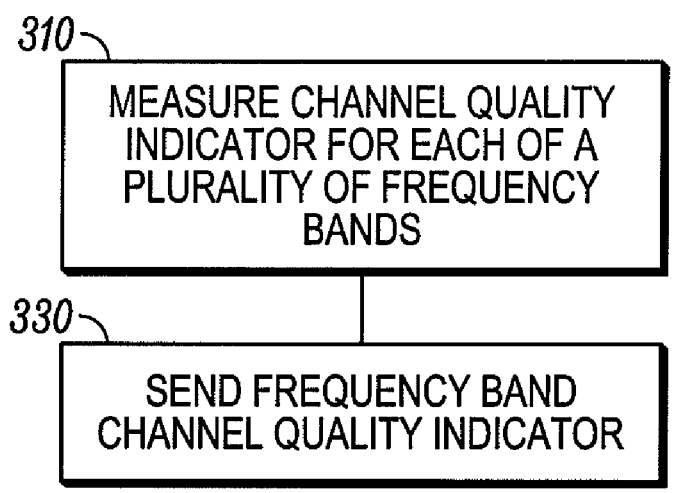
FIG. 3 is an illustrative process flow chart.

In the exemplary process 300 of FIG. 3, at 310, the mobile terminal measures a channel quality indicator for each of a plurality of frequency bands. In an OFDM system, a band may be as small as a single subcarrier, or it may comprise multiple sub-carriers, for example, 15 or 25 sub-carriers. The number of frequency bands measured may cover more than one spatial subchannel as generated with a MIMO type transmitter and receiver involving multiple transmit and receive antennas. The CQI measurements are generally performed periodically, for example, on a frame by frame or multi-frame basis. The measurements may also be event driven. Alternatively, CQI measurements may be requested by the network, or a mobile terminal may autonomously transmit an unsolicited CQI report, for example, if an excessive time period has elapsed between delivery of a prior CQI report and the current time.

The link may operate in a frequency selective (FS) or a frequency non-selective (FNS) mode, or in other modes, for example, hybrid or semi-selective modes. Typically, in FS mode, there is FS (band-specific) CQI reporting and (unless the BS decides otherwise) FS scheduling. Likewise for an FNS mode, FNS CQI reporting and scheduling are performed in that mode. The FS and FNS modes may be used, for example, with low speed (low Doppler) operation and high speed operation, respectively. However, FNS mode may be used in low speed operation as well, for example, to reduce CQI feedback or for scheduler multiplexing reasons. Band specific FS reporting may also be used for FNS scheduling at the cost of increased CQI feedback. In FNS mode, the plurality of frequency bands typically covers a wideband channel wherein substantially the entire bandwidth of the allocated frequency resources, which may be disjoint, is considered. In FNS mode, the measured channel quality indicator for each of a plurality of frequency bands may be expressed as a single FNS (or wideband) channel quality indicator. In FS mode, each of the plurality of frequency bands measured may be a narrowband channel where the totality of narrowband information may still represent a wideband measurement. The channel quality indicator for each of the plurality of frequency bands may be termed FS (or narrowband) channel quality indicators.

The UE may autonomously switch between wideband and narrowband CQI operation, or may do so under instruction from the base station. In the former case, the UE may signal such a change of CQI mode to the base station via physical layer signaling or MAC layer signaling. It is also possible, but perhaps less efficient, to always send a band-specific CQI report. For example, such a report in the context of FS CQI reporting could allow the scheduler to determine whether to schedule in an FS or FNS manner based on details of the CQI report itself, as well as additional UE-specific information (e.g. user-specific Doppler frequency estimate) or additionally signaled information. The selection of FS or FNS scheduling may also be determined by the propagation channel multipath delay profile or mobile terminal capability as well as the service or traffic type supported, for example, packet data requiring a conversational service class Quality of Service (QoS) such as Voice over IP (VoIP), or packet data requiring best effort service such as web browsing or HTTP service. FNS scheduling may be applied, for example, to specific QoS classes or to cases where the multipath channel is not frequency selective, such as a "flat" fading channel where the channel magnitude frequency response is invariant with frequency, or an AWGN channel, or to the case when the CQI reporting rate is not fast enough to account for band CQI variations due to a high Doppler frequency.

The plurality of frequency bands, in terms of band size and number of bands, allocated to each mobile terminal may be determined based on one or more or any combination of uplink system load, traffic type, mobile terminal class, estimated channel Doppler, channel frequency selectivity, coherence bandwidth, cell frequency reuse, achievable SNR, achievable payload, and/or standard deviation of the band CQI. Also, the plurality of frequency bands allocated to a mobile terminal may be split into different groups or channels. In some embodiments, the scheduler determines the frequency bands for which CQI measurements will be made by the mobile station. In these embodiments, the mobile station may receive information, for example, a message, identifying the plurality of frequency bands for which the channel quality indicator is to be measured before measuring. Generally, the identities of the frequency bands for which measurements are to be made may vary. In other embodiments, the mobile station determines the frequency bands for which measurements will be made. In some embodiments, this information is reported to the scheduler either before or after making the measurements.

In some embodiments, the mobile terminal or user equipment (UE) estimates CQI. According to one method, the UE computes the wideband or narrowband CQI using a common or dedicated reference symbol provided by the base station transmission. Alternatively, the UE may compute a CQI based on a combination of pilot and data symbols, or based on data symbols alone. The CQI reported over the pilot symbols may not match the CQI reported over the data symbols, since the pilot symbols may be transmitted in every information frame and may occupy the same time frequency locations in adjacent cells, and the collision and hence interference statistics may be different between the pilot and data observations. In this case, the UE may apply a filter or non-linear operator in the frequency-domain to smooth out non-uniform collision events in frequency. In this case, for synchronous networks, the UE may also perform CQI estimation based on jointly processing the surrounding synchronization or channel sequence symbols from neighboring base stations. The base station may also modify reported CQI measurements based on knowledge of data transmissions from other base stations, or the base station may instruct the UE to do so by providing the necessary network configuration data via signaling.

In FIG. 3, at 330, the mobile terminal sends CQI measurement information for the frequency bands for which the channel quality indicator has been measured to the network scheduler. In one embodiment, the CQI measurement information is in the form of a binary bitmap having a bit field for each of the frequency bands for which measurements were made. Each bit field accommodates one or more bits, which are indicative of CQI measurement information for a corresponding frequency band.

In one embodiment, the mobile terminal cyclically reports CQI measurement information for different bands in successive reports. More particularly, each CQI report includes non-differential channel quality indicator measurement information for at least one of the frequency bands and differential channel quality indicator measurement information for all other frequency bands for which the channel quality indicator was measured. The differential channel quality measurement indicator information is based on CQI measurement information reported previously for the corresponding frequency band. Each successive report includes non-differential channel quality indicator measurement information for one or more different frequency bands and each successive report includes differential CQI measurement indicator information for all other frequency bands for which the channel quality indicator was measured.

Generally reporting the differential CQI measurement information requires fewer bits than are used for reporting the channel quality indicator information, thereby reducing the overall size of the message. In one embodiment, one bit is used for each of the differential CQI measurement indicator information for each frequency band, and the differential CQI measurement indicator information for all bands is represented in a bit map. The bit map in each of the successive reports has a common number of bits. Particularly, the bit map in each report has the same size. The report and the successive reports may also have a common number of bits. For example, the report may have a common number of bits for the bitmap and a common number of bits for the non-differential channel quality indicator measurement information for at least one of the frequency bands. In some embodiments, the report includes additional bits of bit field allocated for information other than CQI measurements, for example, Doppler or UE speed.

In FIG. 4, in a first report 402, CQI information is reported for band 1 and differential CQI information is reported for bands 2-8. In report 504, CQI information is reported for band 2 and differential CQI information is reported for bands 1 and 3-8. Each successive report includes CQI measurement information for a different frequency band until each band has been reported. In other embodiments, CQI information is reported for more than one band, but less than all bands, in each report. Differential CQI information is reported for the other bands. In one embodiment, the non-differential channel quality indicator measurement information is average channel quality indicator measurement information. In FIG. 4, non-differential CQI information is reported in subsequent reports.

In embodiments where the wireless communication device communicates on different channels, the CQI information or reports for the frequency bands on each channel may be sent on some type of rotation basis. More particularly, a different report is generated for the frequency bands measured on each channel and the reports are sent at different time. For example, where the mobile station monitors multiple frequency bands on first and second channels, the CQI reports for each channel may be sent alternately. In embodiments where there are more than two channels, reporting may be on a round robin basis. Other reporting schemes or schedules may also be used.

The CQI measurements and reports are generally made periodically. For example, CQI may be reported every frame or every n frames as some known period. Alternatively, the CQI measurements may be interlaced so that n bands are reported per CQI, for example, odd then even bands. In other embodiments CQI reporting is event driven. The event may be an instruction from Node-B to start a CQI period or the event may include edge-Node specified threshold (used by UE), exceeding which forms an event threshold. The event could include a hysteresis element, for example, start reporting if threshold T is exceeded, but do not stop reporting until reported metric drops below T−Delta where Delta>0. Reporting CQI could be stopped if a timer expires conditioned on not receiving packets. The reporting rate may be dependent on Doppler, for example, send wideband CQI at high speeds.

The CQI may be transmitted by reporting SNR or another SNR-related metric applicable to a pilot symbol broadcast over the entire cell also referred hereto as Global Reference Symbol (GRS). A dedicated pilot CQI can be used to service handoff decisions. The dedicated CQI can be wideband or narrowband depending on the time-resource allocation granted by network. A CQI based on Global Reference Symbol (GRS) does not necessarily reflect an interference level over the data portion of a frame. In synchronous networks, if a TDM approach to GRS is adopted and if GRS is transmitted at full power by all cells and UE processes GRS without regard to adjacent cells, i.e., cells specified in a neighbor list, then the GRS CQI metric will generally indicate a lower achievable SNR than during OFDM symbols assigned to data. A problem could occur in asynchronous networks provided two adjacent cells are aligned in time. The network would need to be specified as synchronous with frame staggering to ensure alignment of GRS with data symbols from adjacent cells. One potential solution is to provide a limited set of reference symbols within OFDM symbols assigned to data to permit CQI generation that reflects actual interference load during data portion of the frame. Such a set of embedded reference symbols could be same symbols as used for dedicated pilot provisioning.

The described frequency band mapping and CQI reporting procedure is also applicable in the case of multiple spatial channels as achieved with a MIMO scheme using multiple antennas at the transmitter and receiver. In one embodiment, a report is sent for all spatial channels. In another embodiment, a report is sent for fewer than all of the spatial channels, for example, for only one of the spatial channels. Generally, the one or more reports each include a bit map for the differential CQI values, and non-differential CQI information for one or more other bands. The selected spatial channel for reporting can be based on highest SNR or SINR metric or some other metric indicating the supported data rate.

While the present disclosure and what are presently considered to be the best modes thereof have been described in a manner establishing possession by the inventors and enabling those of ordinary skill in the art to make and use the same, it will be understood and appreciated that there are many equivalents to the exemplary embodiments disclosed herein and that modifications and variations may be made thereto without departing from the scope and spirit of the inventions, which are to be limited not by the exemplary embodiments but by the appended claims.

What is claimed is:

1. A method in a wireless communication device capable of communicating on a channel comprising a plurality of sub-carriers divided into a plurality of frequency bands, wherein each frequency band includes at least one sub-carrier, the method comprising:

measuring a channel quality indicator for a plurality of frequency bands;

reporting channel quality indicator measurement information in successive reports, each report including non-differential channel quality indicator measurement information for at least one of the frequency bands and each report including differential channel quality indicator measurement information for all other frequency bands for which the channel quality indicator was measured, each successive report including non-differential channel quality indicator measurement information for different frequency bands and each successive report including differential channel quality measurement indicator information for all other frequency bands for which the channel quality indicator was measured.

2. The method of claim 1, each report including non-differential channel quality indicator measurement information for not more than one of the frequency bands, each report including differential channel quality indicator measurement information for all other frequency bands for which the channel quality indicator was measured.

3. The method of claim 2, cyclicly reporting channel quality indicator information for each one of the frequency bands in successive reports.

4. The method of claim 1, reporting non-differential channel quality indicator measurement information includes reporting average channel quality indicator measurement information.

5. The method of claim 1, reporting differential channel quality indicator measurement information in a bit map.

6. The method of claim 5, reporting the non-differential channel quality indicator measurement information separately from the bit map.

7. The method of claim 1, reporting the differential channel quality indicator information using fewer bits than used for reporting channel quality indicator information.

8. The method of claim 1, reporting the differential channel quality indicator measurement information in a bit map wherein the bit map in each of the successive reports has a common number of bits.

9. The method of claim 1, receiving information identifying the plurality of frequency bands for which the channel quality indicator is to be measured before measuring.

10. The method of claim 1, basing the differential channel quality measurement indicator information on channel quality indicator measurement information reported previously for the corresponding channel.

11. A wireless communication terminal, comprising:

a transceiver capable of communicating on a channel comprising a plurality of sub-carriers divided into a plurality of frequency bands, wherein each frequency band includes at least one sub-carrier;

a processor communicably coupled to the transceiver, the processor obtaining channel quality indicator measurements for a plurality of frequency bands, the processor successively generating channel quality indicator measurement information reports based on the channel quality indicator measurements, each report including non-differential channel quality indicator measurement information for at least one of the frequency bands and each report including differential channel quality indicator measurement information for all other frequency bands for which the channel quality indicator was measured, each successive report including non-differential channel quality indicator measurement information for different frequency bands and each successive report including differential channel quality measurement indicator information for all other frequency bands for which the channel quality indicator was measured.

12. The terminal of claim 11, each report includes a bit map having non-differential channel quality indicator measurement information and each the report includes non-differential channel quality indicator measurement information for at least one of the frequency bands.

13. The terminal of claim 12, the bit map in each of the successive reports has substantially the same number of bits.

14. The terminal of claim 11, the report has fewer bits allocated for reporting the differential channel quality indicator information than bits allocated for reporting non-differential channel quality indicator information.

15. The terminal of claim 11, the differential channel quality measurement indicator information is based on channel quality indicator measurement information reported previously for the corresponding channel.

* * * * *